United States Patent [19]
Hoffmann et al.

[11] 4,019,539
[45] Apr. 26, 1977

[54] HOLLOW FLEXIBLE TUBULAR BODY, PROCESS AND APPARATUS FOR MAKING THE SAME

[75] Inventors: Daniel Hoffmann, Bourg-en-Bresse; Remi Reynard, Bordeaux, both of France

[73] Assignees: Societe des Hauts Fourneaux de la Chiers, Longwy-Bas; Coflexip; Institut Francaise du Petrole, des Carburants et Lubrifiants et Entreprise de Recherches et d'Activities Petrolieres Elf, both of Rueil-Malmaison, all of France

[22] Filed: June 9, 1975

[21] Appl. No.: 584,933

Related U.S. Application Data

[63] Continuation of Ser. No. 355,081, April 27, 1973, abandoned.

[30] Foreign Application Priority Data

Apr. 28, 1972  France .............................. 72.15295

[52] U.S. Cl. .............................. 138/118; 138/122; 138/129; 138/130; 138/134

[51] Int. Cl.² .................. F16L 11/00; F16L 11/12; F16L 11/14

[58] Field of Search .......... 138/130, 133, 135, 154, 138/122, 134, 118, 129

[56] References Cited

UNITED STATES PATENTS

| | | | |
|---|---|---|---|
| 1,763,360 | 6/1930 | Kean .................................. | 138/150 |
| 2,168,067 | 8/1939 | Jones .................................. | 138/130 X |
| 2,731,040 | 1/1956 | Warburton ........................ | 138/129 |
| 3,189,052 | 6/1965 | Devaney ........................... | 138/130 |
| 3,500,869 | 3/1970 | Skoggard et al. ................. | 138/130 |
| 3,707,170 | 12/1972 | Mazuir et al. ..................... | 138/154 |

*Primary Examiner*—Henry K. Artis
*Attorney, Agent, or Firm*—Brisebois & Kruger

[57] ABSTRACT

A hollow flexible tubular body which comprises at least one tubular layer. The layer is formed by adjacent helical windings having hooked edges and substantially flat sections. The turns of the helix do not show any spontaneous tendency to increase in diameter.

5 Claims, 8 Drawing Figures

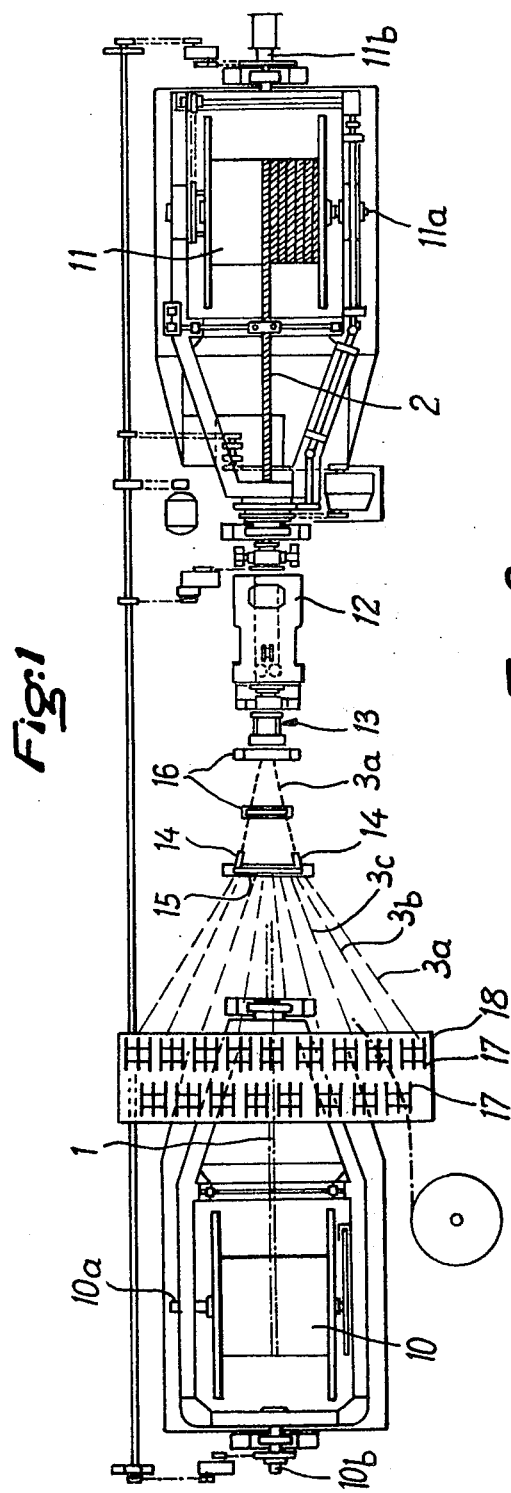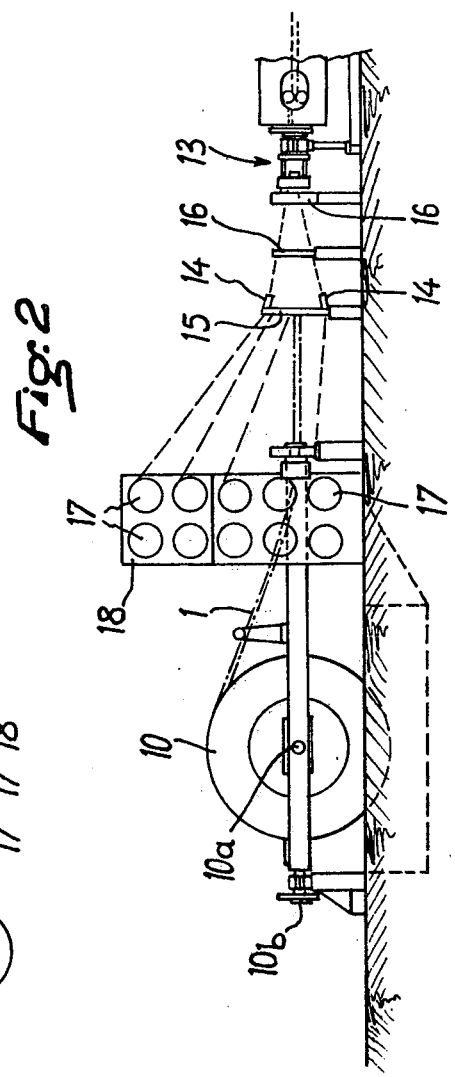

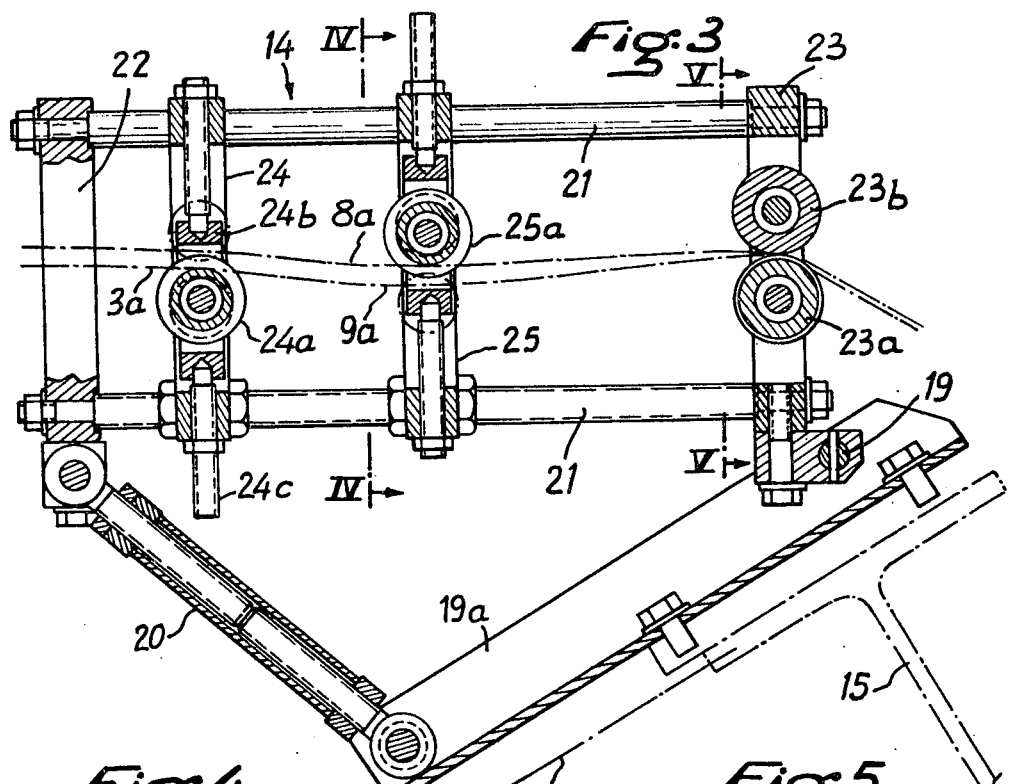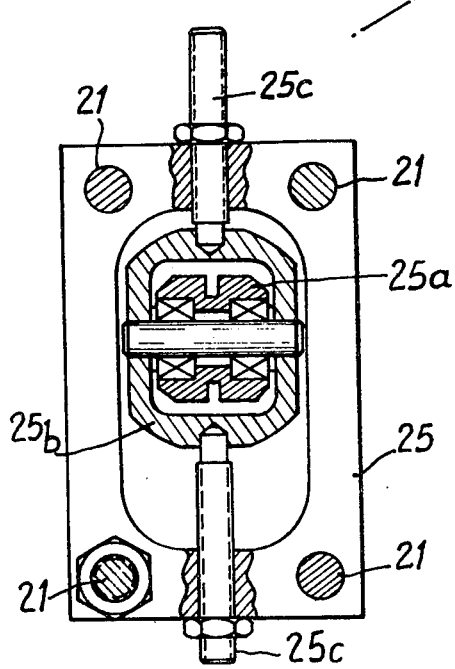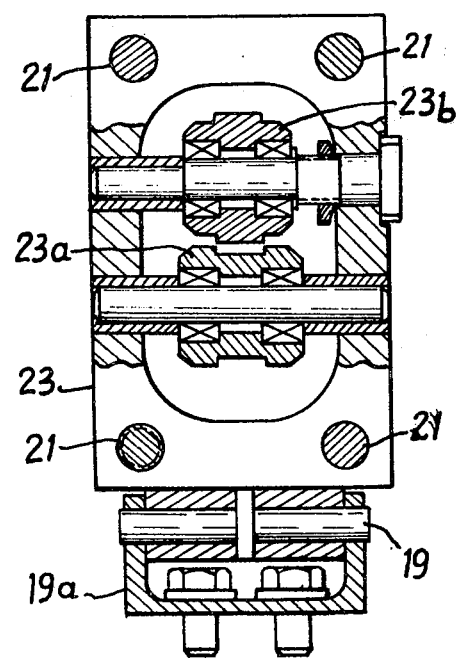

HOLLOW FLEXIBLE TUBULAR BODY, PROCESS AND APPARATUS FOR MAKING THE SAME

This is a continuation, of application Ser. No. 355,081, filed Apr. 27, 1973 now abandoned.

This invention relates to flexible tubular bodies consisting of one or several layers or sheets, referred to herein as sheets, formed by helical winding of metal-shapes, such as steel with good characteristics of elasticity and high strength.

The invention also relates to a process and device for manufacturing these flexible tubular bodies.

This invention intends firstly to supply, as new industrial products, hollow tubular bodies poccessing remarkable stability should the fracture of a steel shape occur, or even that of the complete section of the sheet.

The invention is concerned with a flexible tubular body characterized by the fact that it consists of at least one tubular sheet formed by the helical winding of several adjacent steel shapes having substantially flattened sections the turns of which have no obvious spontaneous tendency to enlarge in diameter.

By "substantially flattened section" is meant a section one part of which at least is substantially flat for example, a section, forming an "S" or a "Z" or a "U".

In one embodiment, the diameters of the turns are of stable dimensions, that is to say that if one theoretically separated a wound steel-shape from the rest of the tubular body, the diameter of the turns would not be changed.

In embodiment, the turns of the sheet may press each other inward with a certain tension; this tension however, can be reduced to almost nil in another embodiment where the turns have no tendency to alter their relative positions.

The shapes forming the aforesaid windings are made of metal such as steel of a high elastic quality and are relatively flat shaped, for instance, as an S or Z.

It will be recelled that metal shapes with such a section, show each side of their median plane, two parts which are off-set in relation to each other in the direction of the aforesaid median plane; the extremities of the above mentioned parts may show curved edges enabling two adjacent steel shapes to interengage by their overlapped edges.

In a preferred embodiment, the flattened section of these steel-shapes, seen in an axial plane of the tubular body, is laid out so that its longest axis is almost parallel with the axis of the tubular body, the lateral edge of the section-part which is then on the outside of the winding being of a greater length to the lateral edge of the section part which is on the inside of the tubular body.

In a particular embodiment of the invention, the tubular body comprises several such sheets which are superposed, either directly, or with the interposition of other tubular items, the winding of the two superposed layers preferably being in opposite direction.

The invention is also concerned with a flexible tubular body, characterized by the fact that it has at least one layer formed by at least one steel shape showing a considerably flattened section and winding in a helical way around a relatively rigid element, resistant to crushing, that is to say, hardly, or not at all subject to flattening, and the adjacent turns of which have no obvious spontaneous tendency to enlarge in diameter.

In a preferred embodiment of such a body, the dimension of the diameter of the turns is stable and therefore does not tend to either augment of diminish.

In a particular embodiment, the winding turns can press against each other with a certain form of elasticity. Nevertheless, in another variant, the spires can also be stable dimension-wise with regard to their relative positions, that is to say that if they wer set free, the winding turns would not tend to alter their relative positions.

The crushing-resistant element can consist, for instance, of a layer formed by one or several metal shapes winding in an helical way.

The invention is also concerned with a process of manufacturing flexible tubular bodies, namely bodies as described above, by which one obtains at least one sheet obtained by helical winding of at least one metal-shape having a considerably flattened section, characterized by the fact that, up the line from the zone of the winding of the shape, one imparts to the steel-shape a permanent helical distortion as when in a free state, (so that turns of the shape or shapes have almost no spontaneous tendency to enlarge in diameter), and by the fact that one then gets the distorted shape to wind round, the part of the shape which is between the zone of winding and the zone of distortion being subjected to a tension less than the elastic limit of the shape.

In a preferred method of implementing this process, one gives the shape a permanent deformation which almost matches the form of the winding shape.

In the process according to the invention, it is possible to impart to the shape, when it is being permanently distorted, such a distortion as also make the winding turns, when they are laid in the sheet, have a tendency to press against the adjacent turns with a certain elastic strength.

In another embodiment the distortion can be such as to reduce this tendency to nil, so that the distorted metal-shape, where it is in a free state, has the same form as when it is wound in the sheet, not taking into account the possible elastic deformation which could be caused by the weight of the metal shape.

In a preferred method of implementing the invention, in which the metal-shape shows a section called 'S' or 'Z' as defined above, and where the adjacent turns overlap, one gives the metal-shape a permanent distortion so that when wound in the sheet, the longest dimension of the shape-section, seen in an axial plane, should be almost parallel with the axis of the tubular body, the length of the edge of the part of the shape which is outside the sheet is greater than the other part of the shape which is inside the sheet.

Advantageously, the permanent deformation inparted to the shape can thus include a phase of permanent deformation of the shape so as to considerably bend it in its own plane, following which, one deforms the shape by twisting it out of its plane, the importance of these deformations are respectively determined, according to the structure of the shape and the characteristics of the required winding.

In accordance with the invention, in the case where the sheet is formed by windings of alternate turns of several shapes, the positions of the winding of the various shapes are preferably regularly distributed around the circular section of the sheet and the paths of the various shapes, between their winding positions and their distortion positions, are preferably equal.

It can be advantageous, after the winding, to ensure a temporary compression of the sheet to make sure that the various turns of the sheet are in good position. However, experience proves that by using the process according to the invention, the proper placing in position of the turns when they are wound, is carried out with practically no difficulty, even in the case of sheets formed by a large number of shapes.

The invention is also concerned with a device to implement this process, a device with a zone for the winding of the shape or shapes, with means for advancing the formed tubular body along an axis, and means to ensure relative rotation between the formed tubular body and the shape or shapes advancing towards the winding zone; the device is characterized by the fact that it comprises, per shape, a "deformation-chamber" with means for imparting to the shape a permanent deformation so that the wound turns do not show any spontaneous tendency to enlarge in diameter, the above mentioned deformation-chamber being remote from the winding zone and situated at a distance from the axis of the tubular body, preferably greater than the radius of the aforesaid body.

In the event of the shapes being wound directly without being in contact with subjacent tubular element, the winding zone can include means for guiding the shape of shapes; these means guiding are designed to lead the shape to the exact place of winding, but do not however impart to the shapes any permanent deformation.

Nevertheless, in the event of the shapes being wound on a subjacent support, these means of guiding can be omitted, so that the already deformed shape advances freely towards the winding zone in which it places itself in position, contary to the already known devices which include a winding chamber which also ensured the deformation by means of strained guiding of the shape advancing to be wound.

In a preferred embodiment, the deformation chamber comprises a set of at least three deformation-rollers, the two first rollers ensuring an arcuate deformation of the shape almost in its own plane, whilst the third roller twists the shape out of its plane.

In a particular embodiment, the three rollers have substantially parallel axes; the first two rollers have narrow and deep grooves into which the shape penetrates, its plane being substantially perpendicular to the axis of the rollers, whilst the third roller can advantageously have a wide shallow groove which guides the shape in a position substantially parallel to the axis of the last roller. The third roller can be accompanied by another roller situated on the other side of the shape. Moreover, the third roller can be a powered-roller.

Perferably means are provided for adjusting the distance between the various rollers in order to vary the extent of the deformations occuring there.

The rollers can be replaced by other means, for instance by simple cylindrical fixed elements, which however have the drawback of creating considerable friction in the "deformation chamber".

Preferably the rollers of the deformation-chamber are distributed in a casing, the axis of which is inclined in relation to the axis of the tubular body in process of formation; means are provided to modify the angle of inclination, in order to be able to modity the angle made by the two ribbons of steel-shapes as they approach and move away form the last roller, thus obtaining a fine adjustment of the amplitude and characteristics of the permanent deformation.

In the event of the sheet being formed by the winding of several shapes, (their number can be very large), the various deformation-chambers are situated, to best advantage, on a ring of large diameter, substantially concentric with the axis of the tubular body being formed; means are provided for ensuring a relative rotary motion between the formed tubular body and the aforesaid ring.

It is equally possible to deform with only one deformation-chamber, at least two flattened superposed shapes.

It is thus possible, through the invention, to produce tubular bodies the sheets of which comprise a very large number of shapes with alternate turns in the sheet, owing to the fact that the distance, between the place where the winding itself occurs and the positions of the various permanent deformation-chambers, can be increased at will.

Other advantages and characteristics of the invention will appear from the reading of the following description of a non-representative example, referring to the attached drawings, in which:

FIG. 1 is a schematic drawing of a device according to the invention, as seen from above.

FIG. 2 is a partial vertical elevation of this device.

FIG. 3 is a schematic vertical cross-section of the permanent deformationchamber of the device.

FIG. 4 is a sectional view on the line IV — IV of FIG. 3.

FIG. 5 is a sectional view on the line V — V of FIG. 3.

Figure 8:
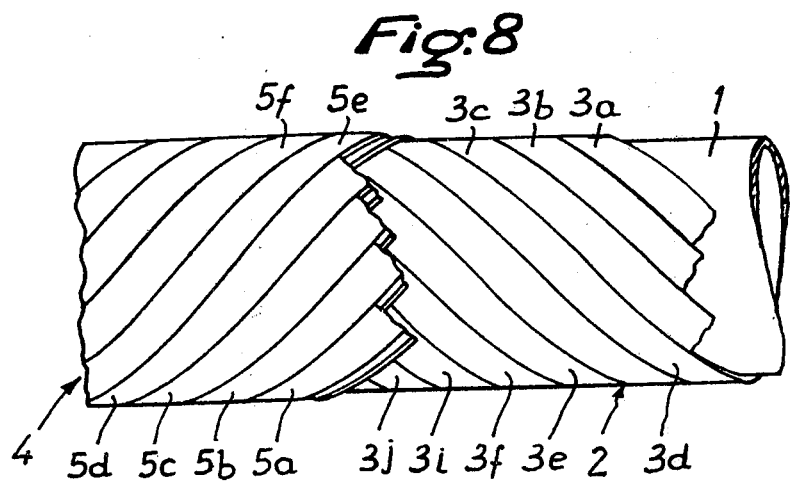
FIG. 8 is a view with partial tearing of a flexible tubular body according to the invention.

Referring first to FIG. 8.

This drawing shows a flexible tubular body in accordance with the invention, which comprises, around an internal, impervious tubular element 1, for instance, made of a synthetic material, a first sheet 2 formed by helical alternate and adjacent windings of a certain number of shapes, 3a, 3b, 3c . . . etc. Around sheet 2 a second sheet 4 is laid, formed by helical alternate and adjacent windings of a certain number of shapes 5a, 5b, 5c . . . etc.

Figure 6:
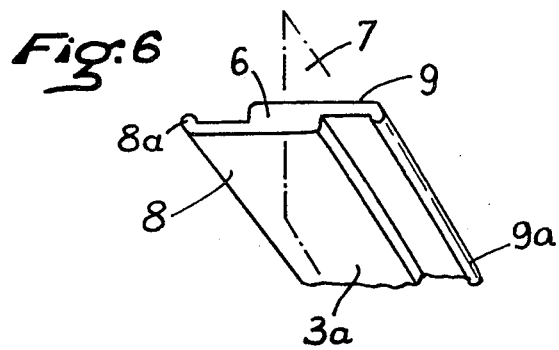
FIG. 6 is the section of a shape which is to be wound.

All the various shapes forming the two sheets have the same section which is shown in detail in FIG. 6. It is shown in this Figure that the section of the shape is substantially flattened and it comprises on each side of a thich central part 6, through which passes a median plane 7, two parts 8 and 9 respectively, of a lesser thickness, these two parts being off-set vertically. Parts 8 and 9 end in a curved edge 8a, 9a in the shape of a hook. It will be understood that in this way, when the shapes are wound as in FIG. 8, the parts 8 of the various shapes are covered by the parts 9 of the adjacent shapes, so that on the outside of a sheet, only parts 9 are visible, internal parts 8 being hidden. This being so, in the case of the body according FIG. 8, in which each turn lies along a cylindrical surface, the length of the external edge 9a of a shape is greater than the length of the internal edge 8a of this same shape.

Of course, sections of shapes other than the well-known one of FIG. 6 can be used, these shapes being designed either to overlap or not.

It is obvious on the other hand that in the case of the shape of FIG. 6, it would be possible to omit the edges 8a and 9a which would simply mean that the adjacent shapes would not longer be hooked to each other.

In conformance with the invention, the permanent deformation of sheet 4, wound on top of sheet 2, is such that the various turns have no tendency to increase in diameter. This means that a winding (for instance the shape winding 5e) is such that, if seperated from the rest of the tubular body, the winding turns would have no tendency to appreciably increase in diameter. It follows that, if one of the shapes were fractured (for instance shape 5e), it would nevertheless keep its form in the sheet and moreover the shape of the adjacent turns would not be altered either.

As for the turns of the windings of sheet 2, they are permanently deformed in such a way as having no tendency to increase or diminished in diameter, that is to say, that if the winding of one of the shapes (3a for instance) was separated from the rest of the tubular body, this winding would not vary in diameter, not taking into accound the elastic stress caused for example by the weight of the shape. This enables one, to obtain the same advantages as for sheet 4, with the additional characteristic that the tendency not to spontaneously diminish in diameter enables the winding turns of sheet 2 not to crush the impervious plastic tubular casting 1.

In the tubular body shown in FIG. 8, it is possible for the windings of sheet 4, either to give to the shapes concerned a deformation similar to that of the shapes of sheet 2, that is to say, a deformation such as not having any tendency to diminish in diameter, or if desired, to give them a greater permanent deformation in order to give them a tendency to diminish in diameter when they are wound in sheet 4. In which case, the turns of the windings of sheet 4 have a tendency to tigthen spontaneously on sheet 2 which nevertheless resists the strain. One obtains thereby an excellent cohesion of the whole of the flexible tubular body.

It can be advantageous, in certain cases, to impart to the turns of one or other sheet 2 and 4, a permanent deformation which, though it does not act, upon the turns as to increase their diameter, presses the turns one against the other with a certain elastic-strength. In this case, the turn 5b would tend to press against the adjacent turn 5a and 5c, which would mean, for a winding which we will suppose is separated from the rest of the flexible tubular body, a tendency for the turns to draw closer.

In another embodiment, however, the turns may have a tendency to draw closer to one another.

In another embodiment of the invention, sheet 4 wound around sheet 2 can be replaced by a sheet formed by only one shape, the turns of which would then be adjacent and would not have any spontaneous tendency to increase in diameter either.

Referring to FIG. 1 and 2.

The device which manufactures hollow tubular bodies such as for instance the one shown in FIG. 8 is shown diagrammatically and comprises two reels, namely one delivery reel 10, adapted to turn on one hand around its own axis 10a, and on the other hand around a horizontal and perpendicular axis 10b and one receiving reel 11, equally capable to turn around its axis 11a, and in synchronism with reel 10, around a horizontal axis 11b, aligned with axis 10b. Reel 10 releases the impervious plastic tubular element 1 which goes forward toward reel 11. Reel 11 receives the tubular element 1 around which is wound sheet 2 formed by many shapes winding in a helical manner.

The device also comprises, down the line immediately after the winding zone 13 of the shapes 3a, 3b, 3c, etc. a cylindrical hollow element 12 capable of turning around the axis 11b in synchronism with reel 11. Inside this element 12, there are caterpillar bands (not seen) which take hold of the tubular body formed by sheet 2 wound around tube 1, to pull it towards reel 11. At the same time as they pull, the caterpillar bands of the element 12, compress the tubular body and thus ensure the correct placing in position of the turns of the sheet. The winding zone 13 receives all the shapes 3a, 3b, 3c, etc., which form sheet 2, these shapes having already been subjected to a permanent deformation in individual chambers 14 distributed on a circular ring 15. In order to make the drawing clear, only a few chambers 14 have been drawn on the ring. Means such as stays 16 can be provided between the ring 15 and the winding zone 13.

The various permanent deformation-chambers 14 are fed by a corresponding number of reels 17 from which the various shapes are unwound. These reels 17 are suitably distributed in a structure 18 and are simply rotatable around their respective axes.

The shapes are drawn from the reels 17 by the traction which is exerted on them by the progression of the tubular body formed by sheet 2 due to the action of the caterpillar bands in the rotary element 12. In the first part of their journey, going from the reels 17 to devices 14, the shapes 3a, 3b, 3c, etc., have not yet been subjected to any permanent deformation. This occurs in the chambers 14. Between the deformation chambers 14 and the winding zone 13, the shapes possess the permanent deformation which was imparted to them in the deformation chambers 14. The traction on individual shapes, exerted by the caterpillar bands, is sufficient to impart an elastic deformation to the shapes between the winding zone 13 and the devices 14, but insufficient to modify the permanent deformation which they have been subjected to. So, when put into practice, the portion of shape between one device 14 and the winding zone 13, does not have a rectilinear aspect, as shown on the drawing in order to simplify it, but a spiral aspect more or less marked according to the extent of the traction applied.

In the device shown in FIG. 1, the reels 10, 11, the element 12 and the tubular body have been made to turn around the aligned axes 10b and 11b, the deformation chambers 14 and the reels 17 being stationary. It will be understood, of course, that in an alternative the reels 10, 11, the element 12 and the tubylar body could be non-rotary whilst the reels 17 and the deformation chambers 14 would be turning around the axis of the tubular body in process of formation.

Referring to FIGS. 3, 4, 5.

The device 14 shown is the one which corresponds to the shape 3a, seen on FIG. 1. This device 14 is fitted so that is revolves around an axis 19, fixed on a plate 19a which is itself integral with the ring 15. The line of alternate dashes and dots marked P represents the vertical plane of the ring 15. The inclination of device 14 around the axis 19 can be adjusted through a screw adjustment device 20.

The device 14 itself, which is seen in FIG. 3, in a section following the diametrical plane of ring 15, comprises four parallel rods 21, one of which is threaded. These parallel rods are supported at their ends by two frames 22 and 23. Two other frames 24 and 25 are fitted on the four rods 21 between the end frames 22 and 23. The frames 22 situated the fartest up the line, simply lets the shape 3a. coming from its reel 17, pass through. The next frame 24, carries a roller 24a freely rotatable around its axis, this axis being itself fixed by a pin in a frame 24b, the position of which in frame 24, can be adjusted by two adjusting screws 24c which go through the frame 24. Suitable nuts ensure that frame 24 stays in a fixed position, these nuts being screwed on the rod 21 which is threaded. As can be seen on FIG. 3, the roller 24a has a deep groove perpendicular to its axis.

The structure of the frame 25 is similar to that of frame 24 and it comprises a roller 25a similar to roller 24a with a groove, the frame 25b being equally supported by screws 25c.

As can be seen the rollers 24a and 25a are placed in the device 14 so at to impart to the shape 3a a permanent deformation shaped like a sabre blade, that is to say an arcuate deformation in the own plane of the shape 3a. Thus, one sees that the edge 8a of the shape 3a becomes shorter than the edge 9a which elongates. The extent of this deformation depends, of course, on the general conditions of the winding.

After leaving the roller 25a, the shape 3a which has already been subjected to a deformation in its own plane, progresses towards a pair of rollers 23a, 23b, the axes of which are substantially parallel to the axes of the rollers 24a and 25a, and which are supported by the frame 23. One of the two rollers namely the roller 23a, has a circular wide but shallow groove, whilst the roller 23b has on its circumference a flange which corresponds to the groove of the roller 23a. Thus the shape 3a which leaves the roller 25a following a plane which remains substantially perpendicular to the axis of the roller 25a, will become permanently deformed out of its plane, since it reaches the groove of the roller 23a in a position practically perpendicular to the former plane.

After leaving the rollers 23a, 23b, the permanently deformed shape progresses forward to the winding zone.

To adjust the different characteristics of the permanent deformation, one understands that all it needs is to adjust one one hand the relative spacing of the frames 24, 25, and 23 and on the other hand, to move accordingly the rollers 24a and 25a in their respective frames. Moreover, another adjustment is possible by operating the device 20, which appreciably alters the angle formed between the longitudinal direction of the device 14 and the axis of the flexible tubular body in formation. By changing this angle one changes also the angle formed between the position of shape 3a which leaves the rollers 23a, 23b and the position of shape which reaches these rollers.

Figure 7:
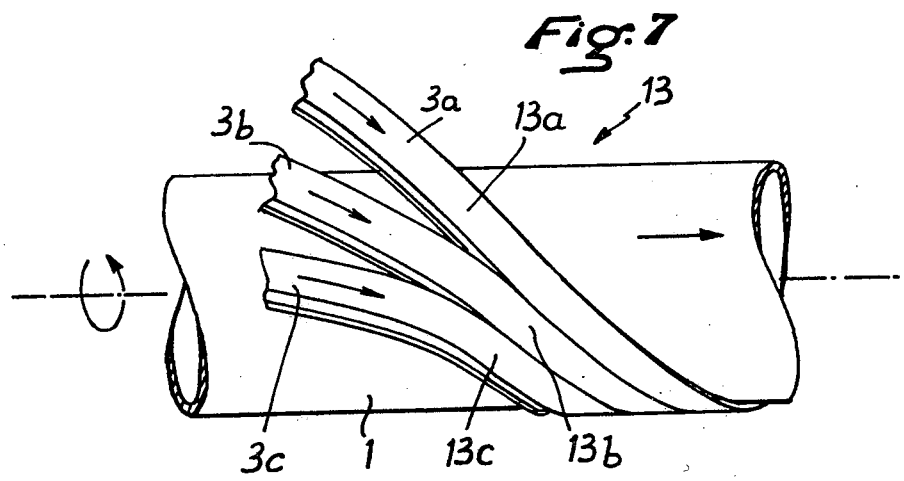
FIG. 7 is a view of three shapes of a sheet being wound.

Referring to FIG. 7.

This Figure, shows in detail the way in which the various shapes, forming the sheet 2, are wound. (Only the shapes 3a, 3b and 3c have been drawn in order to simplify the drawing). The winding occurs on its own accord, as the previous deformation of each one of these shapes corresponds to the form that these shapes have when they are wound in the flexible tubular body, so that no guiding device is necessary to guide the shape on the relatively long journey between the deformation chamber 14 and zone 13. One sees that the various shapes start winding at positions 13a, 13b and 13c which are substantially distributed on a same circle. At these positions, the parts 9 of the shapes come to cover the parts 8 of adjacent shapes. Arrows represent the axial forward motion of the formed tubular body, the rotary motion of the same body as well as the journey of these shapes on their trajectories between zone 13 and their respective deformation chambers 14.

If need be, it is possible to provide near the winding zone 13, devices to guide the shapes. These guiding devices do not however, impart to the shapes any permanent deformation. Such guiding devices, for instance guide fingers or eyes, can be useful when for instance the shapes are prestressed with a tendency to diminish the diameter of their turns or when they tend to press against each other through elastic stress. The guiding devices which only bear moderate stresses, need not be situated immediately near the winding zone.

In the case where only one single shape forming the sheet is wound around a rigid internal body, the winding can be carried out as in the case shown in FIG. 7, on its own accord, without any guiding means being provided in the winding zone.

As an example, in accordance with the invention, a flexible tubular body has been produced having: an impervious casing made of Rielsan (French trade Mark) 3mm thick with an external diameter of 127 mm, and a first sheet of 46 shapes with section shaped as Z, 3 mm thick, placed to the right forming an angle of about 28° with the axis of the tubular body. Around the sheet of 133 mm in diameter thus formed, is wound a sheet made of 48 Z shapes 3 thick also, previously deformed and placed this time to the left, forming an angle of about 28° with the axis.

For the shapes of the internal sheet, the permanent deformation corresponded to a helix with a 768 mm right-handed thread, that is to say, having the same thread as the winding of the sheet with the turns having an internal diameter of 100 mm and an external diameter of 106 mm, whilst for the shapes of the external sheet, the premanent deformation corresponded to a 768 mm left-handed thread, that is to say less than the thread (804 mm) of the winding in the sheet, with a 106 mm internal diameter and a 112 mm theoretical external diameter. The thread inside the second sheet being less than the thread of the winding, the turns have a slight elastic tendency to get closer to one another.

The invention is not of course limited to the embodiments described as examples, and one understands that one could form through the invention, extremely complex flexible tubular bodies, comprising various sheets or interposed tubular elements, some of the aforesaid sheets being formed by one or several shapes deformed according to the invention.

Moreover, the permanent deformation of the shapes can be carried out differently, according the nature and the geometrical characteristics of the shape and according to the required winding characteristics.

The flexible tubular bodies produced through the invention can be applied to various uses. They can form, among other things, dlexible tubing for "flexoboring," pipes which are immersed or not, for example to collect or transport hydrocarbons. In a general way, they are suitable for all cases where one meets strong dynamic forces and where high performances are required.

We claim:

1. A flexible tubular body comprising a plurality of superposed tubular layers, each formed from a plurality of elongated strips of resilient metal having two substantially parallel edges and helically wound about a hollow flexible tube to form a layer, each strip having its parallel edges hooked in opposite directions, with the edges of adjacent helically wound strips overlapping and so engaged as to permit limited relative sliding axially of said body, and each strip having been prestressed by twisting it helically until permanently deformed before being wound about said flexible tube, the strips in the innermost of each two adjacent layers being deformed to form helics having an inner diameter approximating the outer diameter of the said flexible tube, and the strips of the outermost layer being deformed to form helics having an inner diameter smaller than the outer diameter of said innermost layer, so as to exert compressive force on said innermost layer.

2. A flexible tubular body as claimed in claim 1 in which the turns of each tubular layer are biassed against each other by their own elasticity.

3. A flexible tubular body as claimed in claim 1 in which the edge of each strip which is the radially outermost of two overlapping edges is longer than the edge which is innermost.

4. Flexible tubular body as claimed in claim 1 in which the superposed layers are wound in opposite directions.

5. A flexible tubular body as claimed in claim 1 in which said tubular layer is wound about a hollow flexible tube.

* * * * *

UNITED STATES PATENT OFFICE
CERTIFICATE OF CORRECTION

PATENT NO. : 4,019,539
DATED : April 26, 1977
INVENTOR(S) : Daniel Hoffmann; Remi Reynard It is certified that error appears in the above-identified patent and that said Letters Patent are hereby corrected as shown below:

[73] Assignees: Societe des Hauts Fourneaux de la Chiers, Longwy-Bas; Coflexip; Institut Francais du Petrole, des Carburants et Lubrifiants, both of Rueil-Malmaison, all of France Signed and Sealed this Twenty-seventh Day of December 1977

[SEAL]

Attest:

RUTH C. MASON
Attesting Officer

LUTRELLE F. PARKER
Acting Commissioner of Patents and Trademarks